(12) United States Patent
Jiang et al.

(10) Patent No.: US 11,653,208 B2
(45) Date of Patent: *May 16, 2023

(54) INVALID MEASUREMENT INDICATION IN LOCATION MEASUREMENT REPORT

(71) Applicant: Intel Corporation, Santa Clara, CA (US)

(72) Inventors: Feng Jiang, Santa Clara, CA (US);
Qinghua Li, San Ramon, CA (US);
Jonathan Segev, Sunnyvale, CA (US);
Assaf Gurevitz, Ramat Hasharon (IL);
Danny Alexander, Neve Efraim Monoson (IL); Xiaogang Chen, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/581,629

(22) Filed: Jan. 21, 2022

(65) Prior Publication Data

US 2022/0338011 A1      Oct. 20, 2022

Related U.S. Application Data

(63) Continuation of application No. 16/233,054, filed on Dec. 26, 2018, now Pat. No. 11,234,129.

(60) Provisional application No. 62/617,492, filed on Jan. 15, 2018.

(51) Int. Cl.
| | |
|---|---|
| *H04W 12/121* | (2021.01) |
| *H04W 64/00* | (2009.01) |
| *H04W 24/10* | (2009.01) |
| *H04K 3/00* | (2006.01) |
| *G01S 13/76* | (2006.01) |
| *G01S 7/02* | (2006.01) |
| *H04L 25/02* | (2006.01) |
| *G01S 7/36* | (2006.01) |

(52) U.S. Cl.
CPC .......... *H04W 12/121* (2021.01); *G01S 7/023* (2013.01); *G01S 13/765* (2013.01); *H04K 3/00* (2013.01); *H04L 25/0224* (2013.01); *H04W 24/10* (2013.01); *H04W 64/00* (2013.01); *G01S 7/36* (2013.01)

(58) Field of Classification Search
CPC ... H04W 12/121; H04W 24/10; H04W 64/00; G01S 7/023; G01S 13/765; G01S 7/36; H04K 3/00; H04L 25/0224
See application file for complete search history.

(56) References Cited

U.S. PATENT DOCUMENTS

| | | | |
|---|---|---|---|
| 10,667,237 B2* | 5/2020 | Seok | G01S 11/02 |
| 2018/0310133 A1* | 10/2018 | Ramasamy | G01S 5/0242 |

* cited by examiner

*Primary Examiner* — Kabir A Timory
(74) *Attorney, Agent, or Firm* — Eversheds Sutherland (US) LLP

(57) ABSTRACT

This disclosure describes systems, methods, and devices related to an invalid location measurement report (LMR) indication. A device may identify a first null data packet (NDP) received from a first station device during, wherein the first NDP is used for channel sounding. The device may perform a time of arrival (ToA) calculation based on the NDP. The device may determine an invalid indication associated with the first NDP based on the ToA calculation. The device may generate an LMR comprising of the invalid measurement indication. The device may cause to send the LMR to the first device.

20 Claims, 8 Drawing Sheets

INVALID MEASUREMENT INDICATION IN LOCATION MEASUREMENT REPORT

CROSS-REFERENCE TO RELATED APPLICATION(S)

This application is a continuation of U.S. Non-Provisional application Ser. No. 16/233,054, filed Dec. 26, 2018, which claims the benefit of U.S. Provisional Application No. 62/617,492, filed Jan. 15, 2018, the disclosure of which is incorporated herein by reference as if set forth in full.

TECHNICAL FIELD

This disclosure generally relates to systems, methods, and devices for wireless communications and, more particularly, indication of attacker in measurement reports.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
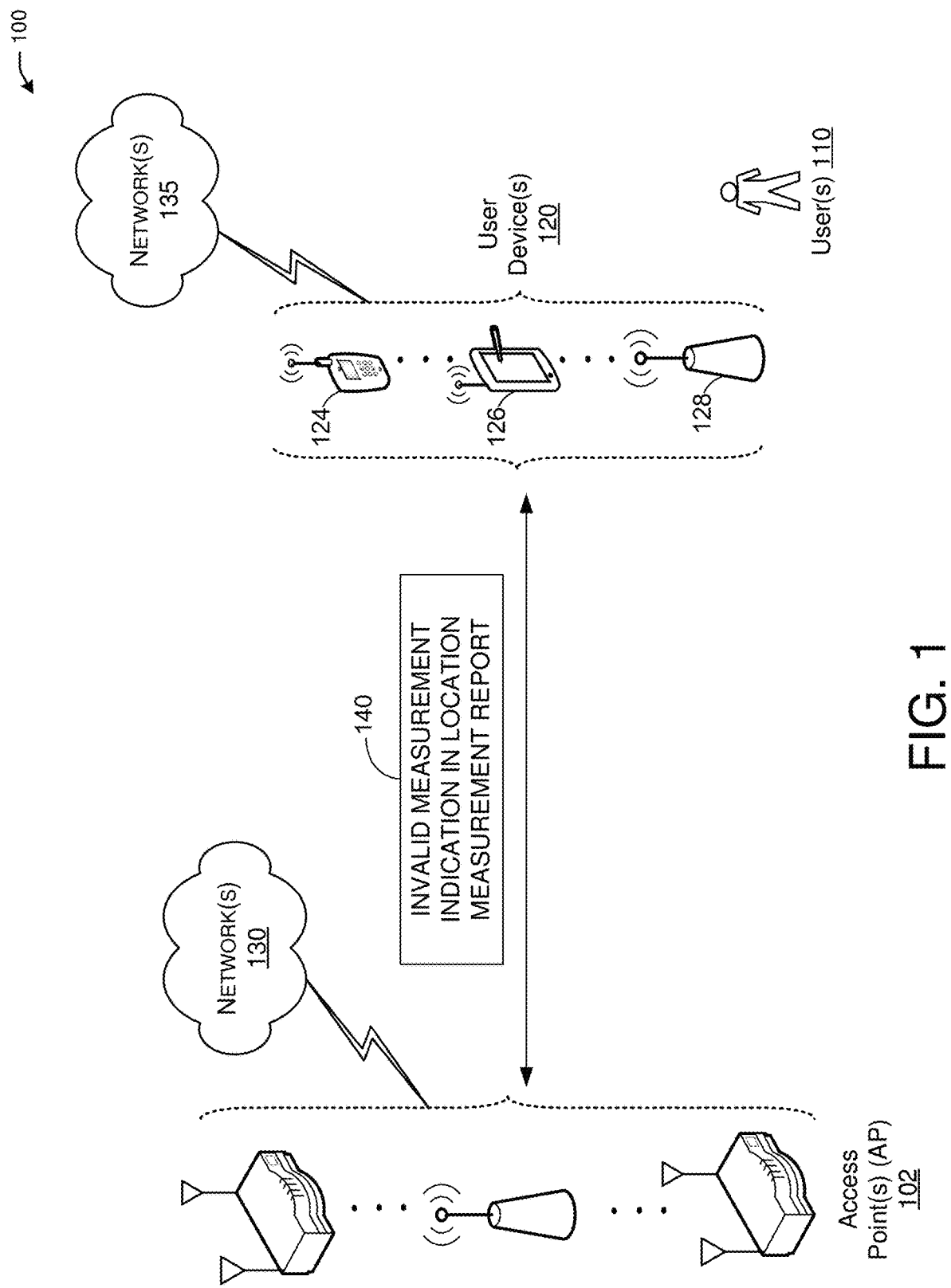
FIG. 1 depicts a diagram illustrating an example network environment of illustrative location measurement report (LMR) attacker indication system, in accordance with one or more example embodiments of the present disclosure.

Example embodiments described herein provide certain systems, methods, and devices, for indication of replay attacker or jammer in measurement report.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In the development of 802.11az, the physical layer (PHY) level security is a critical issue that needs to be addressed. The most popular PHY-level threat is the replay attacker or jammer, which can spoof the receiver and cause wrong range estimation. In some scenarios, an energy detector at the receiver side may be present to detect the replay attacker during the high efficiency (HE) long training field (LTF) symbols, and consistency check over multiple channel estimations at receiver side may be used to detect the jammer or interference during the HE-LTF symbols. Both of these scenarios relate to how to detect the attacker or jammer at the receiver, but there is no determination regarding how to use these detection results. In the measurement phase of a ranging procedure, if the range estimation error is due to additive noise, then several measurement results can be averaged to reduce the noise's impact. However, if the range estimation is under replay attack or jamming, then this range estimation result should not be used. Currently, there is no mechanism for the transmitter (e.g., an initiator) of the sounding frames during a ranging procedure to know that an attack is in progress. For example, the initiator sends a null data packet (NDP) in the uplink direction to the receiver (e.g., a responder). The attacker or jammer may intercept and modify that NDP before sending it to the receiver. The receiver may then detect that the NDP is altered and hacked.

The channel estimation for time of arrival (ToA) calculation may be under replay attack or jamming, and when the responder (receiver) detects such an attack, the responder does not send any indication to the initiator (transmitter).

Example embodiments of the present disclosure relate to systems, methods, and devices for location measurement report (LMR) attacker indication.

In one or more embodiments, an indication of attacker system may facilitate that channel estimation for ToA calculation may be under replay attack or jamming, and when the responder detects such an attack, the responder may send an indication to the initiator, such that the initiator will discard the current measurement results and for security purposes the initiator may disable the ranging service or associate with another responder for ranging service.

In one or more embodiments, an indication of attacker system may define a parameter field in the LMR to enable the responder to indicate the existence of replay attacker or jammer to the initiator.

In one or more embodiments, the proposed parameter field in the LMR may enable the initiator to differentiate between the ToA error due to noise and the ToA error due to interference or replay attack, such that the initiator can behave accordingly. For example, the initiator may disable the ranging service or associate with another responder for ranging service.

In one or more embodiments, an Invalid LMR indication system may report an attack using an LMR in case of sounding procedure in a multi-user scenario, in scenarios between two users, and in bi-directional LMR scenarios.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 is a diagram illustrating an example network environment, in accordance with one or more example embodiments of the present disclosure. Wireless network 100 may include one or more user devices 120 and one or more access point(s) (AP) 102, which may communicate in accordance with IEEE 802.11 communication standards.

The user device(s) 120 may be mobile devices that are non-stationary (e.g., not having fixed locations) or may be stationary devices.

Figure 6:
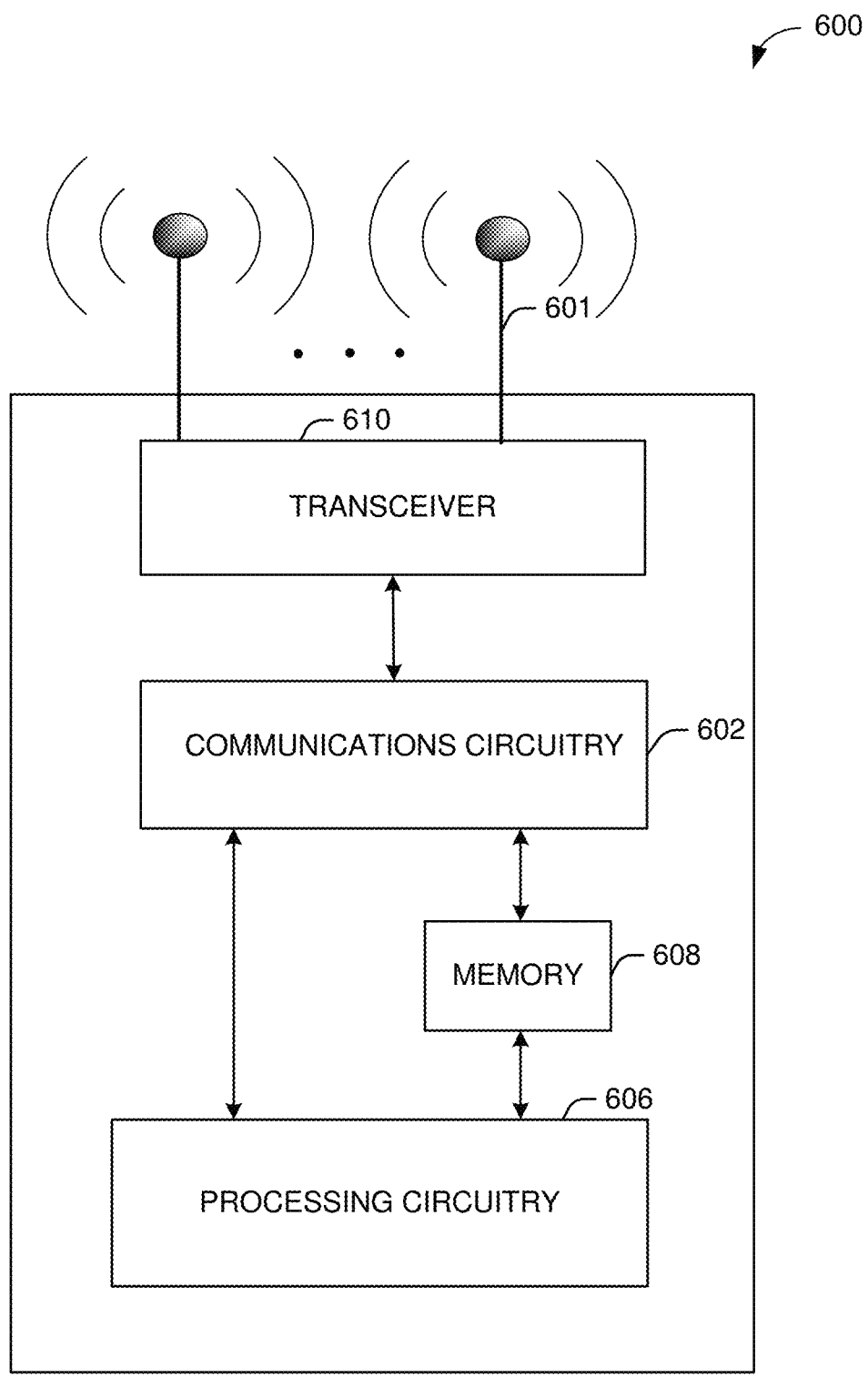
FIG. 6 depicts a functional diagram of an example communication station, in accordance with one or more example embodiments of the present disclosure.
Figure 7:
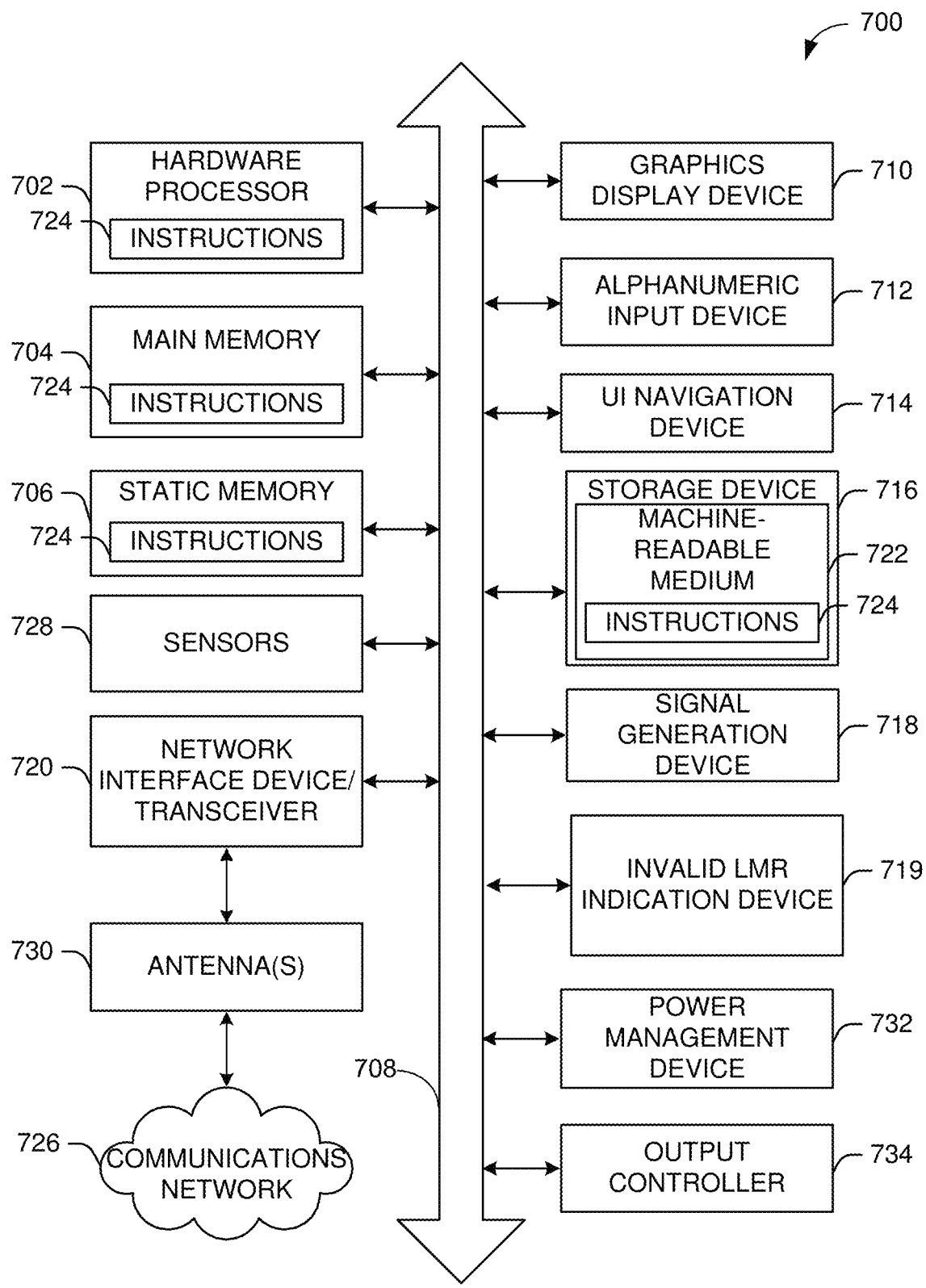
FIG. 7 depicts a block diagram of an example machine upon which any of one or more techniques (e.g., methods) may be performed, in accordance with one or more example embodiments of the present disclosure.

In some embodiments, the user devices 120, and the AP(s) 102 may include one or more computer systems similar to that of the functional diagram of FIG. 6 and/or the example machine/system of FIG. 7.

One or more illustrative user device(s) 120 and/or AP(s) 102 may be operable by one or more user(s) 110. It should be noted that any addressable unit may be a station (STA). An STA may take on multiple distinct characteristics, each of which shapes its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra-mobile device (UMD), an ultra-mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards.

Some embodiments may be used in conjunction with devices and/or networks operating in accordance with existing. Wireless Fidelity (Wi-Fi) Alliance (WFA) Specifications, including Wi-Fi Neighbor Awareness Networking (NAN) Technical Specification (e.g., NAN and NAN2) and/or future versions and/or derivatives thereof, devices and/or networks operating in accordance with existing WFA Peer-to-Peer (P2P) specifications and/or future versions and/or derivatives thereof, devices and/or networks operating in accordance with existing Wireless-Gigabit-Alliance (WGA) specifications (Wireless Gigabit Alliance, Inc. WiGig MAC and PHY Specification) and/or future versions and/or derivatives thereof, devices and/or networks operating in accordance with existing IEEE 802.11 standards and/or amendments (e.g., 802.11b, 802.11g, 802.11n, 802.11ac, 802.11ax, 802.11ad, 802.11ay, 802.11az, etc.).

In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, a user device 120 may be in communication with one or more APs 102.

For example, AP 102 may communicate with a user device 120 by signaling invalid measurement indication in LMR 140 between each other. It is understood that the above descriptions are for purposes of illustration and are not meant to be limiting.

Figure 2:
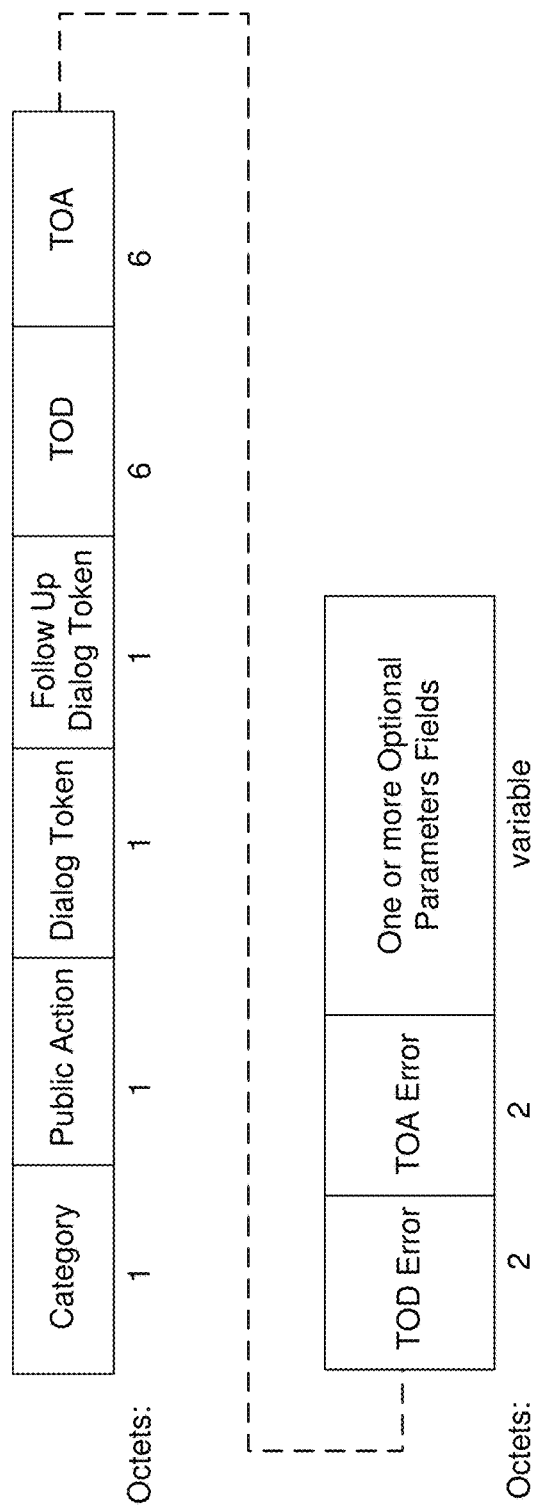
FIG. 2 depicts an illustrative schematic diagram for fine timing measurement action field format, in accordance with one or more example embodiments of the present disclosure.

FIG. 2 depicts an illustrative schematic diagram 200 for a location measurement report format.

Referring to FIG. 2, there is shown a location measurement report format, which may include one more fields. These one more fields may comprise a category field, a public action field, a dialogue token field, a time of departure (ToD) field, a time of arrival (ToA) field, a ToD error field, a ToA error field, and one or more optional parameters fields (e.g., a CFO parameter field, a secure LTF parameters field, and/or a ranging CSI information field).

It is understood that the above descriptions are for purposes of illustration and are not meant to be limiting.

FIGS. 3A-3D depict illustrative schematic diagrams for Invalid LMR indication, in accordance with one or more example embodiments of the present disclosure.

Figure 3A:
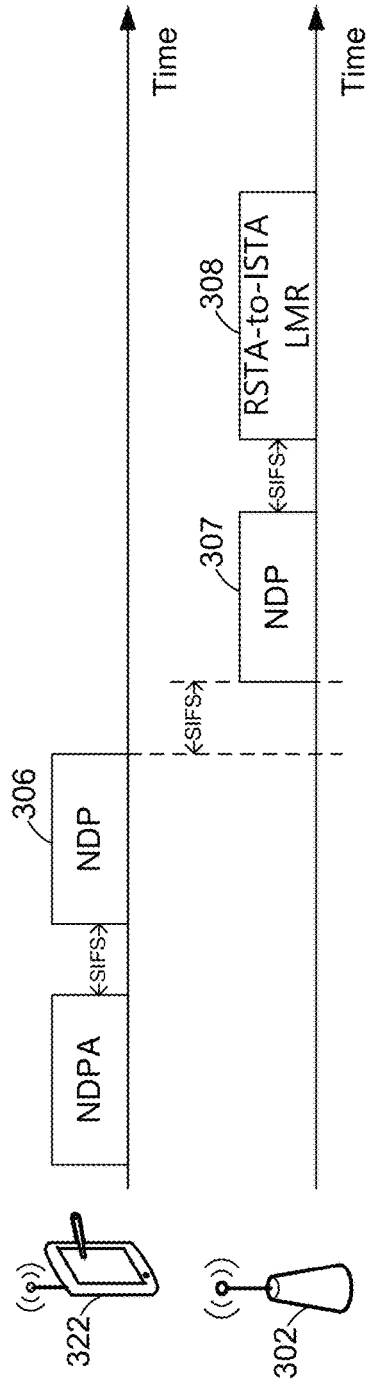
FIGS. 3A-3D depict illustrative schematic diagrams for Invalid LMR indication, in accordance with one or more example embodiments of the present disclosure.

Referring to FIG. 3A, there is shown an initiating STA (ISTA) device 322 that is performing a ranging procedure with a responding STA (RSTA) 302. The ranging procedure may involve measurement exchange following the sequence shown in FIG. 3A. The sequence comprises the ISTA 322 sending a null data packet announcement (NDPA) which is then followed by an NDP 306 used for the ranging procedure. The NDP 306 may be an uplink (UL) NDP which is sent from the ISTA 322 to the RSTA 302. The ISTA 322 may wait a short inter-frame space (SIFS) time between the NDPA and the uplink NDP 306. The RSTA 302 may wait a SIFS time before sending its downlink (DL) NDP 307 to the ISTA 322. Then the RSTA 302 may send the report (e.g., RSTA-to-ISTA 308) of the ranging calculations including calculations associated with the ToA retrieved from the UL NDP 306. The RSTA-to-ISTA 308 may carry the ToA based on the UL NDP 306 and the ToD based on the DL NDP.

In one or more embodiments, an Invalid LMR indication system may facilitate that channel estimation for the ToA calculation may be under replay attack or jamming, and when the RSTA 302 detects such an attack, the RSTA 302 may send an indication to the ISTA 322, such that the ISTA 322 may discard the current measurement results and for security purposes the ISTA 322 may disable the ranging service or associate with another responder for ranging service. For example, the RSTA 302 may detect that the TOA calculations resulted in an abnormal result based on the UL NDP 306 from the ISTA 322. When the RSTA 302 detects this abnormal result, the RSTA 302 may set an indication in the RSTA-to-ISTA 308 such that the ISTA 322 is notified of this abnormal result. The indication may be included in a specific field, referred to as invalid measurement field in the RSTA-to-ISTA 308, which may use one or more bits of the reserved bits in the ToA Error field of the RSTA-to-ISTA 308 to indicate that the channel sounding is under replay attack or jamming or the NDP is not received successfully due to interference or noise. The invalid measurement field of the RSTA-to-ISTA 308 may be set to either a 0 or a 1. A value of 0 may indicate that the ToA carried in the RSTA-to-ISTA 308 is valid, while a value of 1 may indicate that the ToA carried in the LMR is invalid.

In one or more embodiments, the proposed parameter field in the LMR may enable the ISTA 322 to differentiate between the ToA error due to noise and the ToA error due to interference or replay attack, such that the ISTA 322 can behave accordingly. For example, the ISTA 322 may disable the ranging service or associate with another responder for ranging service.

Figure 3B:
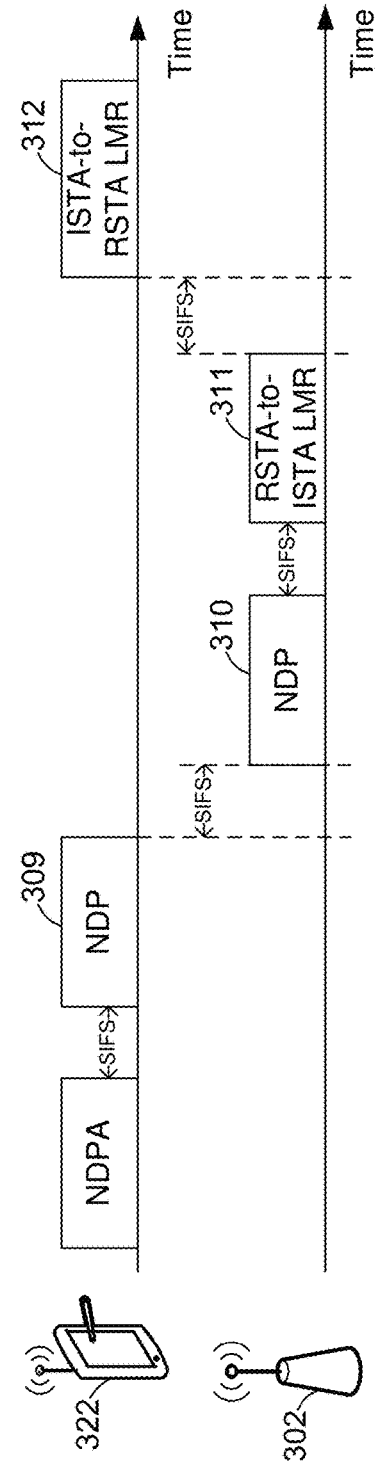

Referring to FIG. 3B, there is shown an initiating STA (ISTA) device 322 that is performing a ranging procedure with a responding STA (RSTA) 302.

In this scenario the ISTA 322 and the RSTA 302 may have negotiated that both devices would send a measurement report. In this case, the LMR feedback can be bi-directional. That is the ISTA 322 would send the RSTA 302 an ISTA-to-RSTA LMR 312 and the RSTA 302 would send the ISTA 322 an RSTA-to-ISTA LMR 311. Each device in this scenario, would have the opportunity to notify the other device of an ensuing attack or interference based on the received NDP. For example, the ISTA 322 would be able to include in the ISTA-to-RSTA LMR 312, an indication (e.g., setting a bit). The indication may use one or more bits of the reserved bits in the ToA Error field of the ISTA-to-RSTA LMR 312 to indicate that the channel sounding is under replay attack or jamming or the NDP is not received successfully due to interference or noise. Since there are 11 reserved bits in the ToA Error field, these reserved bits can be used to indicate the following information: (1) There exists replay attack or jamming or the NDP is not received successfully due to interference or noise, and the ToA carried in the LMR is invalid; and/or (2) Power level of interference signal. Similarly, the RSTA 302 may be able to include in the RSTA-to-ISTA LMR 311 an indication, where the indication uses one or more bits of the reserved bits in the ToA Error field of the RSTA-to-ISTA LMR 311 to indicate that the channel sounding is under replay attack or jamming and the ToA is invalid in the ToA Error Field of the RSTA-to-ISTA LMR 311.

In one or more embodiments, in case of an attack on either of the NDP 309 or NDP 310, the device that receives the corresponding NDP would be able to utilize its respective LMR in order to report the attack to the other device. For example, if NDP 309 was attacked, the RSTA 302 would determine based on ToA calculation that the NDP 309 may be under replay attack or jamming, and when the RSTA 302 detects such an attack, the RSTA 302 may send an indication to the ISTA 322, such that the ISTA 322 may discard the current measurement results and for security purposes the ISTA 322 may disable the ranging service or associate with another responder for ranging service. For example, the RSTA 302 may detect that the TOA calculations resulted in an abnormal result based on the UL NDP 309 from the ISTA 322. When the RSTA 302 detects this abnormal result, the RSTA 302 may set an indication in the RSTA-to-ISTA 308 such that the ISTA 322 is notified of this abnormal result. The indication may be included in a specific field, referred to as invalid measurement field in the LMR 311, which may use one or more bits of the reserved bits in the ToA Error field of the RSTA-to-ISTA LMR 311 to indicate that the channel sounding is under replay attack or jamming in the ToA Error Field of the RSTA-to-ISTA LMR 311. The invalid measurement field of the RSTA-to-ISTA LMR 311 may be set to either a 0 or a 1. A value of 0 may indicate that the ToA carried in the LMR is invalid, while a value of 1 may indicate that the ToA carried in the LMR is valid.

In one or more embodiments, the proposed parameter field (e.g., invalid measurement field) in the LMR may enable the ISTA 322 to differentiate between the ToA error due to noise and the ToA error due to interference or replay attack, such that the ISTA 322 can behave accordingly. For example, the ISTA 322 may disable the ranging service or associate with another responder for ranging service.

Figure 3C:
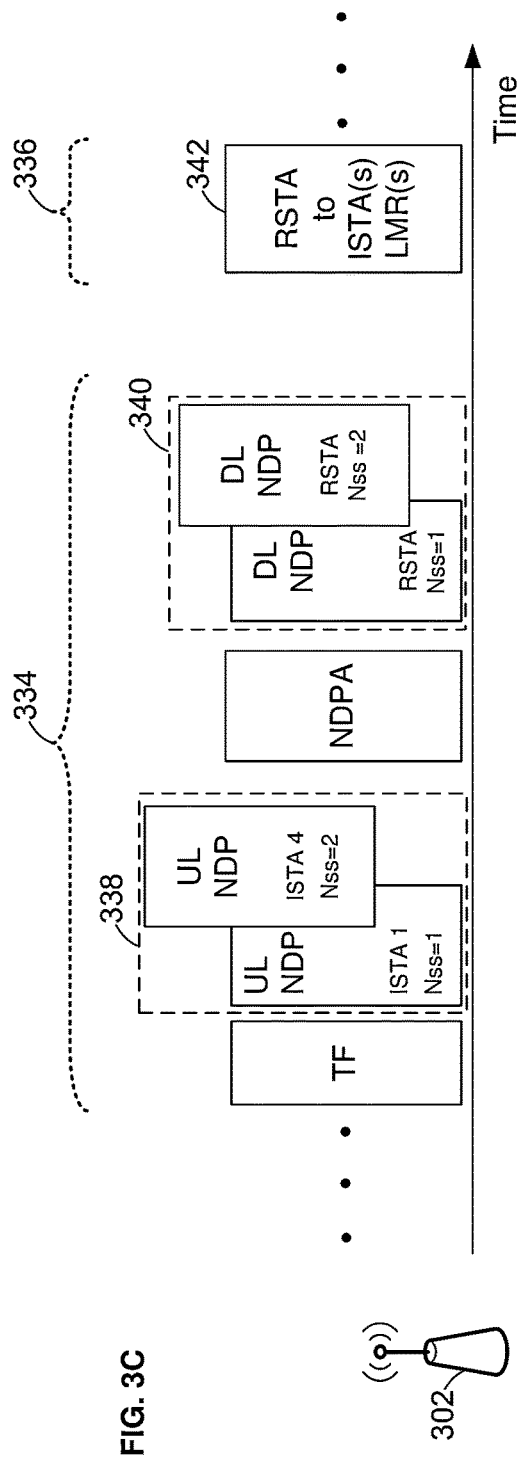

Referring to FIG. 3C, there is shown a range measurement sequence of a ranging procedure between an RSTA 302 and one or more ISTAs (e.g., ISTA 1 and ISTA 4, shown in this example). A range measurement sounding part 334 starts SIFS time after the location polling part (not shown) and is the second part of the range measurement sequence.

The range measurement sounding part 334 may be composed of one or more trigger frames (TFs), of type Location subtype Sounding, allocating uplink resources to one or more ISTAs (e.g., ISTA 1 and ISTA 4). The one or more TFs may be followed by one or more UL NDPs 338 multiplexed in the frequency and/or spatial stream domain received from the one or more ISTAs (e.g., ISTA 1 and ISTA 4). SIFS time after the last UL sounding (e.g., the one or more UL NDPs 338), the RSTA 302 may transmit an NDPA frame followed by one or more DL NDPs 340. In this scenario, the one or more UL NDPs 338 and the one or more DL NDPs 340 may be under replay attack or jamming. In the case where the one or more UL NDPs 338 are under replay attack or jamming, the RSTA 302 may detect that the ToA calculations resulted in an abnormal result based on the one or more UL NDPs 338 from at least one of the one or more ISTAs. When the RSTA 302 detects this abnormal result, the RSTA 302 may set an indication in the RSTA to ISTA(s) LMR 342 such that at least one of the one or more ISTAs is notified of this abnormal result. The indication may be included in a specific field, referred to as invalid measurement field in the RSTA to ISTA(s) LMR 342, which may use one or more bits of the reserved bits in the ToA Error field of the RSTA to ISTA(s) LMR 342 to indicate that the channel sounding is under replay attack or jamming or the NDP is not received correctly in the ToA Error Field of the RSTA to ISTA(s) LMR 342. The invalid measurement field of the RSTA to ISTA(s) LMR 342 may be set to either a 0 or a 1. A value of 0 may indicate that the ToA carried in the LMR is valid, while a value of 1 may indicate that the ToA carried in the LMR is valid.

In case the RSTA 302 and the one or more ISTAs negotiated that both the RSTA 302 and the one or more ISTAs would send respective measurement reports, then the one or more ISTA to RSTA LMRs may be sent to the RSTA 302. When the one or more ISTAs detect this abnormal result, the one or more ISTAs may set an indication in the one or more ISTA to RSTA LMRs (not shown) such that the RSTA 302 is notified of this abnormal result. The indication may be included in a specific field, referred to as invalid measurement field in the one or more ISTA to RSTA LMRs, which may use one or more bits of the reserved bits in the ToA Error field of the one or more ISTA to RSTA LMRs to indicate that the channel sounding is under replay attack or jamming or the NDP is not received successfully due to interference or noise in the ToA Error Field of the one or more ISTA to RSTA LMRs. The invalid measurement field of the one or more ISTA to RSTA LMRs may be set to either a 0 or a 1. A value of 0 may indicate that the ToA carried in the LMR is valid, while a value of 1 may indicate that the ToA carried in the LMR is invalid.

Figure 3D:
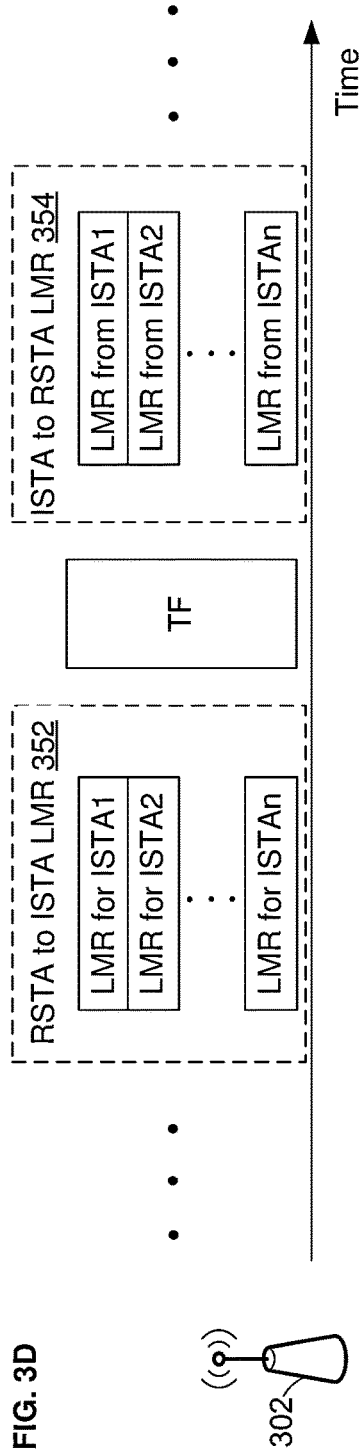

Referring to FIG. 3D, there is shown a range measurement sequence of a ranging procedure between an RSTA 302 and one or more ISTAs (e.g., ISTA 1, ISTA 2, . . . , ISTA n, where n is a positive integer). A range measurement sounding part (not shown) starts SIFS time after the location polling part (not shown) and is the second part of the range measurement sequence.

The last part of each measurement phase instance is the measurement reporting phase 350. The measurement reporting phase 350 may appear SIFS time after the measurement sounding phase. The measurement results may be carried in LMR frames. LMR frames may carry measurement results from RSTA 302 to the one or more ISTAs (e.g., ISTA 1, ISTA 2, . . . , ISTA n), and if it was negotiated, from the one or more ISTAs (e.g., ISTA 1, ISTA 2, . . . , ISTA n), to RSTA 302.

In the case where the one or more UL NDPs from the one or more ISTAs (e.g., ISTA 1, ISTA 2, . . . , ISTA n) are under replay attack or jamming or the NDP is not received successfully due to interference or noise, the RSTA 302 may detect that the ToA calculations resulted in an abnormal result based on the one or more UL NDPs from at least one of the one or more ISTAs. When the RSTA 302 detects this abnormal result, the RSTA 302 may set an indication in the RSTA to ISTA(s) LMR 342 such that at least one of the one or more ISTAs is notified of this abnormal result. The indication may be included in a specific field, referred to as invalid measurement field in the RSTA to ISTA(s) LMR 352, which may use one or more bits of the reserved bits in the ToA Error field of the RSTA to ISTA(s) LMR 352 to indicate that the channel sounding is under replay attack or jamming or the NDP is not received correctly in the ToA Error Field of the RSTA to ISTA(s) LMR 352. The invalid measurement field of the RSTA to ISTA(s) LMR 352 may be set to either a 0 or a 1. A value of 0 may indicate that there is no attack and the ToA carried in the LMR is valid, while a value of 1 may indicate that the ToA carried in the LMR is invalid.

In case the RSTA 302 and the one or more ISTAs negotiated that both the RSTA 302 and the one or more ISTAs would send respective measurement reports, then the ISTA to RSTA LMR 354 may be sent to the RSTA 302. The ISTA to RSTA LMR 354 may be comprised of one more LMRs from the one or more ISTAs. For example, if ISTA 2 detects this abnormal result, the ISTA 2 may set an indication in its respective LMR (e.g., LMR from ISTA 2) such that the RSTA 302 is notified of this abnormal result. The indication may be included in a specific field, referred to as invalid measurement field in the LMR from ISTA 2, which may use one or more bits of the reserved bits in the ToA Error field of the LMR from ISTA 2 to indicate that the channel sounding is under replay attack or jamming or the NDP is not received successfully due to interference or noise in the ToA Error Field of the LMR from ISTA 2. The invalid measurement field of the LMR from ISTA 2 may be set to either a 0 or a 1. A value of 0 may indicate that the ToA carried in the LMR is valid, while a value of 1 may indicate that the ToA carried in the LMR is invalid.

It is understood that the above descriptions are for purposes of illustration and are not meant to be limiting.

Figure 4:
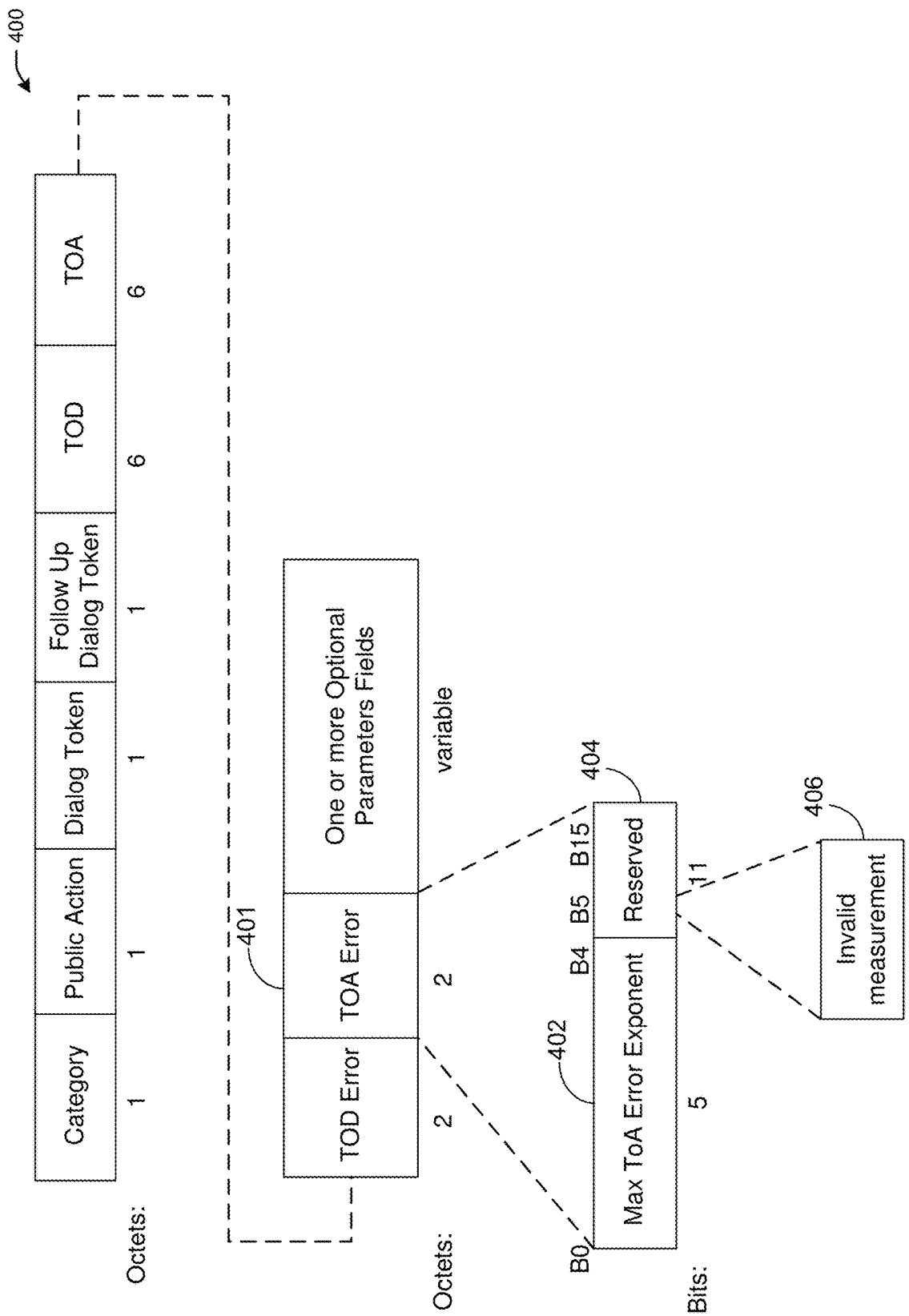
FIG. 4 depicts an illustrative schematic diagram for Invalid LMR indication, in accordance with one or more example embodiments of the present disclosure.

FIG. 4 depicts an illustrative schematic diagram for Invalid LMR indication, in accordance with one or more example embodiments of the present disclosure.

Referring to FIG. 4, there is shown a location measurement report format 400, which may include one more fields. These one more fields may comprise a category field, a public action field, a dialogue token field, a time of departure (ToD) field, a time of arrival (ToA) field, a ToD error field, a ToA error field 401, and one or more optional parameters fields (e.g., a CFO parameter field, a secure LTF parameters field, and/or a ranging CSI information field). The TOA error field 401 may comprise a Max TOA Error Exponent subfield 402 and a Reserved bits subfield 404.

In one or more embodiments, an Invalid LMR indication system may use the reserved bits subfield 404 in the ToA Error field 401 to indicate that the channel sounding is under replay attack or jamming. Since there are 11 reserved bits subfield 404 in the ToA Error field 401, one more of the reserved bits of the reserved bits subfield 404 may be used to indicate the following information: (1) There exists replay attack or jamming or the NDP is not received successfully due to interference or noise, and the ToA carried in the LMR is invalid; and/or (2) power level of interference signal.

For example, one or more reserved bits of the reserved bits subfield 404 may be used as an indication and may be referred to as an invalid measurement field 406. The invalid measurement field 406 may be included in a LMR frame. The invalid measurement field 406 may indicate that the channel sounding is under replay attack or jamming or the NDP is not received successfully due to interference or noise in the ToA Error Field 401 of the LMR frame. The invalid measurement field 406 of the LMR frame may be set to either a 0 or a 1. A value of 0 may indicate that there is no attack and the ToA carried in the LMR is valid, while a value of 1 may indicate that the NDP is not received successfully due to interference or noise and the corresponding ToA carried in the LMR is invalid.

In one or more embodiments, an Invalid LMR indication system may facilitate two alternative methods to define the parameter field for indication of replay attack or jammer: (1) adding an additional parameter field in the location measurement report; and (2) using a special value of ToA error field to indicate that the channel sounding is under replay attack or jamming or the NDP is not received successfully due to interference or noise.

In one or more embodiments, an Invalid LMR indication system may add an additional parameter field in the location measurement report. For example, a field referred to as Interference Indication may be used to indicate that the channel sounding is under replay attack or jamming. The number of bits for this parameter field may be left to implementation and system configuration. The bit values could be used to indicate the following information: (i) There exists replay attack or jamming or the NDP is not received successfully due to interference or noise, and the ToA carried in the LMR is invalid; and/or (ii) Power level of interference signal.

In one or more embodiments, an Invalid LMR indication system may use a special value of ToA Error field to indicate that the channel sounding is under replay attack or jamming or the NDP is not received successfully due to interference or noise. The ToA Error field may include 16 bits, and 11 bits are reserved bits. Specific values of the Max ToA Error Exponent field can be defined to indicate the following information. For example, the bit value of Max ToA Error Exponent may be set to "11111" to indicate the channel sounding is under replay attack or jamming. The number of bits for this parameter field is implementation specific, and the bit values could be used to indicate the following information: (i) There exists replay attack or jamming or the NDP is not received successfully due to interference or noise, and the ToA carried in the LMR is invalid; and/or (ii) Power level of interference signal.

In one or more embodiments, an Invalid LMR indication system may add an angle of arrival (AOA) information in the measurement report feedback to improve the positioning accuracy and efficiency. To utilize the angle information, the measurement report frame need to include the AOA field and the AOA Error field. For the feedback of AOA information, the above mentioned methods can also be applied to indicate the existence of replay attack or jamming or the NDP is not received successfully due to interference or noise. It is understood that the above descriptions are for purposes of illustration and are not meant to be limiting.

Figure 5:
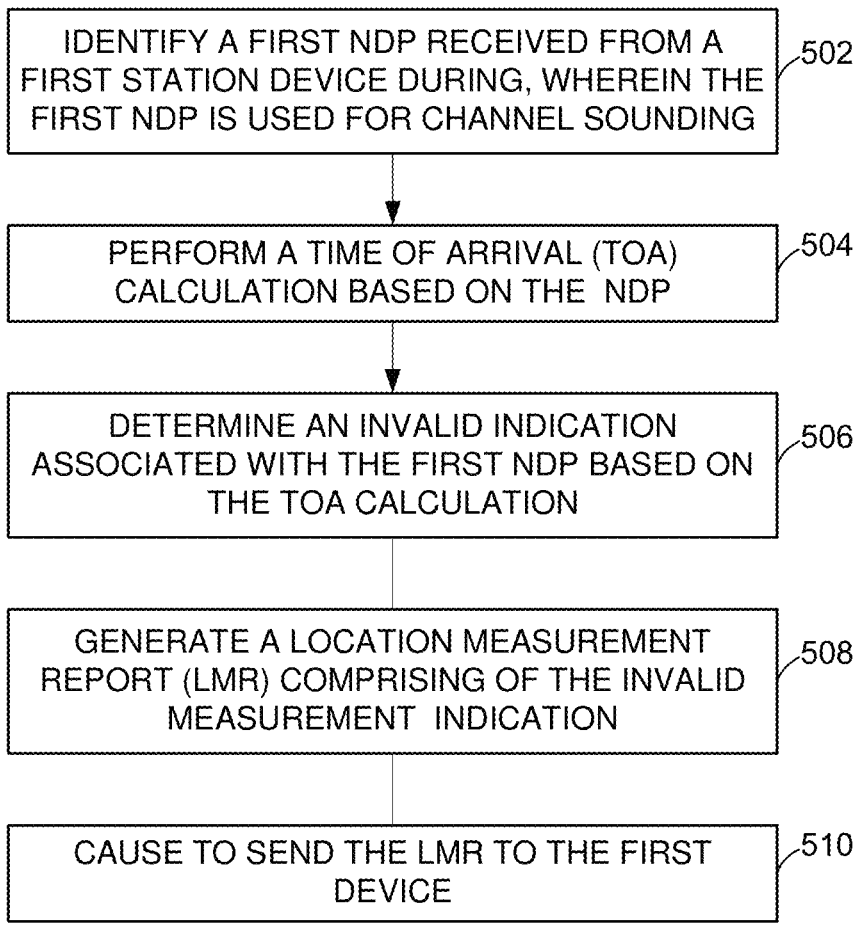
FIG. 5 depicts a flow diagram of illustrative process for an Invalid LMR indication system, in accordance with one or more example embodiments of the disclosure.

FIG. 5 illustrates a flow diagram of illustrative process 500 for an illustrative Invalid LMR indication system, in accordance with one or more example embodiments of the present disclosure.

At block 502, a device (e.g., the user device(s) 120 and/or the AP 102 of FIG. 1) may identify a first NDP received from a first station device during, wherein the first NDP is used for channel sounding. In some examples, the device may be a responder device and wherein the first NDP is an uplink NDP. In some examples, the device may be an initiator device and wherein the first NDP is a downlink NDP.

At block 504, the device may perform a channel estimation and a time of arrival (ToA) calculation based on the NDP. In some examples, the ToA calculation may be based on a time domain or a frequency domain channel estimation utilizing the NDP.

At block 506, the device may determine an invalid measurement indication associated with the first NDP based on the channel estimation or ToA calculation. In some examples, the invalid indication may be included in an invalid measurement field of LMR based on the first NDP received from the first station device. In some examples, the invalid measurement field may use one or more reserved bits of a ToA Error field of the LMR. In some examples, the invalid measurement field may indicate that the ToA carried in the LMR is invalid and the corresponding NDP is not successfully received due to attack or jamming or interference or noise when the invalid measurement field is set to a value of "1".

At block 508, the device may generate a location measurement report (LMR) comprising of the invalid indication. In some examples, the LMR may be a responding STA (RSTA) to an initiating STA (ISTA) LMR. In some examples, the LMR may be an initiating STA (ISTA) to a responding STA (RSTA) LMR.

At block 510, the device may cause to send the LMR to the first device.

It is understood that the above descriptions are for purposes of illustration and are not meant to be limiting.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or a user device 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The transceiver 610 may be a device comprising both a transmitter and a receiver that are combined and share common circuitry (e.g., communication circuitry 602). The communication circuitry 602 may include amplifiers, filters, mixers, analog to digital and/or digital to analog converters. The transceiver 610 may transmit and receive analog or digital signals. The transceiver 610 may allow reception of signals during transmission periods. This mode is known as full-duplex, and may require the transmitter and receiver to operate on different frequencies to minimize interference between the transmitted signal and the received signal. The transceiver 610 may operate in a half-duplex mode, where the transceiver 610 may transmit or receive signals in one direction at a time.

The communications circuitry 602 may include circuitry that can operate the physical layer (PHY) communications and/or media access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 1-5.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), an invalid LMR indication device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The invalid LMR indication device 719 may carry out or perform any of the operations and processes (e.g., process 500) described and shown above. For example, the invalid LMR indication device 719 may facilitate that channel estimation for ToA calculation may be under replay attack or jamming, and when the responder detects such an attack, the responder may send an indication to the initiator, such that the initiator will discard the current measurement results and for security purposes the initiator may disable the ranging service or associate with another responder for ranging service.

The invalid LMR indication device 719 may define a parameter field in the LMR to enable the responder to indicate the existence of replay attacker or jammer to the initiator.

The invalid LMR indication device 719 may facilitate that the proposed parameter field in the LMR may enable the initiator to differentiate between the ToA error due to noise and the ToA error due to interference or replay attack, such that the initiator can behave accordingly. For example, the initiator may disable the ranging service or associate with another responder for ranging service.

The invalid LMR indication device 719 may report an attack using an LMR in case of sounding procedure in a multi-user scenario, in scenarios between two users, and in bi-directional LMR scenarios.

It is understood that the above are only a subset of what the Invalid LMR indication device 719 may be configured to perform and that other functions included throughout this disclosure may also be performed by the Invalid LMR indication device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: identify a first NDP received from a first station device during, wherein the first NDP may be used for channel sounding; perform a time of arrival (ToA) calculation based on the NDP; determine an invalid indication associated with the first NDP based on the ToA calculation; generate a location measurement report (LMR) comprising of the invalid measurement indication; and cause to send the LMR to the first device.

Example 2 may include the device of example 1 and/or some other example herein, wherein the device may be a responder device and wherein the first NDP may be an uplink NDP.

Example 3 may include the device of example 1 and/or some other example herein, wherein the device may be an initiator device and wherein the first NDP may be a downlink NDP.

Example 4 may include the device of example 1 and/or some other example herein, wherein the invalid indication may be included in an invalid measurement field of LMR based on the first NDP received from the first station device.

Example 5 may include the device of example 1 and/or some other example herein, wherein the invalid measurement field uses one or more reserved bits of a ToA Error field of the LMR.

Example 6 may include the device of example 1 and/or some other example herein, wherein the ToA calculation may be based on a time domain or a frequency domain channel estimation utilizing the NDP.

Example 7 may include the device of example 1 and/or some other example herein, wherein the invalid measurement field indicates that the ToA carried in the LMR may be invalid and the corresponding NDP may be not successfully received due to attack or jamming or interference or noise when the invalid measurement field may be set to a value of "1".

Example 8 may include the device of example 1 and/or some other example herein, wherein the LMR may be a responding STA (RSTA) to an initiating STA (ISTA) LMR.

Example 9 may include the device of example 1 and/or some other example herein, wherein the LMR may be an initiating STA (ISTA) to a responding STA (RSTA) LMR.

Example 10 may include the device of example 1 and/or some other example herein, further comprising a transceiver configured to transmit and receive wireless signals, wherein the wireless signals are associated with the LMR and the NDP.

Example 11 may include the device of example 9 and/or some other example herein, further comprising an antenna coupled to the transceiver.

Example 12 may include a non-transitory computer-readable medium storing computer-executable instructions which when executed by one or more processors result in performing operations comprising: identifying a first NDP received from a first station device during, wherein the first NDP may be used for channel sounding; performing a time of arrival (ToA) calculation based on the NDP; determining an invalid indication associated with the first NDP based on the ToA calculation; generating a location measurement report (LMR) comprising of the invalid indication; and causing to send the LMR to the first device.

Example 13 may include the non-transitory computer-readable medium of example 12 and/or some other example herein, wherein the device may be a responder device and wherein the first NDP may be an uplink NDP.

Example 14 may include the non-transitory computer-readable medium of example 12 and/or some other example herein, wherein the device may be an initiator device and wherein the first NDP may be a downlink NDP.

Example 15 may include the non-transitory computer-readable medium of example 12 and/or some other example herein, wherein the invalid indication may be included in an invalid measurement field of LMR based on the first NDP received from the first station device.

Example 16 may include the non-transitory computer-readable medium of example 12 and/or some other example herein, wherein the invalid measurement field uses one or more reserved bits of a ToA Error field of the LMR.

Example 17 may include the non-transitory computer-readable medium of example 11 and/or some other example herein, wherein the ToA calculation may be based on a time domain or a frequency domain channel estimation utilizing the NDP.

Example 18 may include the non-transitory computer-readable medium of example 12 and/or some other example herein, wherein the invalid measurement field indicates that the ToA carried in the LMR may be invalid and the corresponding NDP may be not successfully received due to attack or jamming or interference or noise when the invalid measurement field may be set to a value of "1".

Example 19 may include the non-transitory computer-readable medium of example 12 and/or some other example herein, wherein the LMR may be a responding STA (RSTA) to an initiating STA (ISTA) LMR.

Example 20 may include the non-transitory computer-readable medium of example 12 and/or some other example herein, wherein the LMR may be an initiating STA (ISTA) to a responding STA (RSTA) LMR.

Example 21 may include a method comprising: identifying a first NDP received from a first station device during, wherein the first NDP may be used for channel sounding; performing a time of arrival (ToA) calculation based on the NDP; determining an invalid indication associated with the first NDP based on the ToA calculation; generating a location measurement report (LMR) comprising of the invalid measurement indication; and causing to send the LMR to the first device.

Example 22 may include the method of example 21 and/or some other example herein, wherein the device may be a responder device and wherein the first NDP may be an uplink NDP.

Example 23 may include the method of example 21 and/or some other example herein, wherein the device may be an initiator device and wherein the first NDP may be a downlink NDP.

Example 24 may include the method of example 21 and/or some other example herein, wherein the invalid indication may be included in an invalid measurement field of LMR based on the first NDP received from the first station device.

Example 25 may include the method of example 21 and/or some other example herein, wherein the invalid measurement field uses one or more reserved bits of a ToA Error field of the LMR.

Example 26 may include the method of example 21 and/or some other example herein, wherein the ToA calculation may be based on a time domain or a frequency domain channel estimation utilizing the NDP.

Example 27 may include the method of example 21 and/or some other example herein, wherein the invalid measurement field indicates that the ToA carried in the LMR may be invalid and the corresponding NDP may be not successfully received due to attack or jamming or interference or noise when the invalid measurement field may be set to a value of "1".

Example 28 may include the method of example 21 and/or some other example herein, wherein the LMR may be a responding STA (RSTA) to an initiating STA (ISTA) LMR.

Example 29 may include the method of example 21 and/or some other example herein, wherein the LMR may be an initiating STA (ISTA) to a responding STA (RSTA) LMR.

Example 30 may include an apparatus comprising means for: identifying a first NDP received from a first station device during, wherein the first NDP may be used for channel sounding; performing a time of arrival (ToA) calculation based on the NDP; determining an invalid indication associated with the first NDP based on the ToA calculation; generating a location measurement report (LMR) comprising of the invalid measurement indication; and causing to send the LMR to the first device.

Example 31 may include the apparatus of example 30 and/or some other example herein, wherein the device may be a responder device and wherein the first NDP may be an uplink NDP.

Example 32 may include the apparatus of example 30 and/or some other example herein, wherein the device may be an initiator device and wherein the first NDP may be a downlink NDP.

Example 33 may include the apparatus of example 30 and/or some other example herein, wherein the invalid indication may be included in an invalid measurement field of LMR based on the first NDP received from the first station device.

Example 34 may include the apparatus of example 30 and/or some other example herein, wherein the invalid measurement field uses one or more reserved bits of a ToA Error field of the LMR.

Example 35 may include the apparatus of example 30 and/or some other example herein, wherein the ToA calculation may be based on a time domain or a frequency domain channel estimation utilizing the NDP.

Example 36 may include the apparatus of example 30 and/or some other example herein, wherein the invalid measurement field indicates that the ToA carried in the LMR may be invalid and the corresponding NDP may be not successfully received due to attack or jamming or interference or noise when the invalid measurement field may be set to a value of "1".

Example 37 may include the apparatus of example 30 and/or some other example herein, wherein the LMR may be a responding STA (RSTA) to an initiating STA (ISTA) LMR.

Example 38 may include the apparatus of example 30 and/or some other example herein, wherein the LMR may be an initiating STA (ISTA) to a responding STA (RSTA) LMR.

Example 39 may include one or more non-transitory computer-readable media comprising instructions to cause an electronic device, upon execution of the instructions by one or more processors of the electronic device, to perform one or more elements of a method described in or related to any of examples 1-38, or any other method or process described herein Example 40 may include an apparatus comprising logic, modules, and/or circuitry to perform one or more elements of a method described in or related to any of examples 1-38, or any other method or process described herein.

Example 41 may include a method, technique, or process as described in or related to any of examples 1-38, or portions or parts thereof.

Example 42 may include an apparatus comprising: one or more processors and one or more computer readable media comprising instructions that, when executed by the one or more processors, cause the one or more processors to perform the method, techniques, or process as described in or related to any of examples 1-38, or portions thereof.

Example 43 may include a method of communicating in a wireless network as shown and described herein.

Example 44 may include a system for providing wireless communication as shown and described herein.

Example 45 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
    decode a null data packet (NDP), for channel sounding, received from a station device during a ranging procedure;
    generate an invalid measurement value associated with a time of arrival (ToA) based on the NDP;
    generate a location measurement report frame comprising one or more fields;
    encode the invalid measurement value into a ToA error field of the location measurement report frame; and
    cause to send the location measurement report (LMR) frame to the station device.

2. The device of claim 1, wherein the processing circuitry is further configured to set the invalid measurement value to 1 to indicate that the ToA is invalid.

3. The device of claim 1, wherein the processing circuitry is further configured to set the invalid measurement value to 0 to indicate that the ToA is valid.

4. The device of claim 1, wherein the device is a responding STA (RSTA).

5. The device of claim 1, wherein the device is an initiating STA (ISTA).

6. The device of claim 1, wherein the ToA error field comprises an invalid measurement subfield.

7. The device of claim 1, wherein the LMR frame is a responding STA (RSTA) to an initiating STA (ISTA) LMR frame.

8. The device of claim 1, wherein the LMR frame is an initiating STA (ISTA) to a responding STA (RSTA) LMR frame.

9. The device of claim 1, further comprising a transceiver configured to transmit and receive wireless signals.

10. The device of claim 9, further comprising an antenna coupled to the transceiver to cause to send the frame.

11. A non-transitory computer-readable medium storing computer-executable instructions which when executed by one or more processors result in performing operations comprising:
  decoding a null data packet (NDP), for channel sounding, received from a station device during a ranging procedure;
  generating an invalid measurement value associated with a time of arrival (ToA) based on the NDP;
  generating a location measurement report frame comprising one or more fields;
  encoding the invalid measurement value into a ToA error field of the location measurement report frame; and
  cause to send the location measurement report (LMR) frame to the station device.

12. The non-transitory computer-readable medium of claim 11, wherein the operations further comprise setting the invalid measurement value to 1 to indicate that the ToA is invalid.

13. The non-transitory computer-readable medium of claim 11, wherein the operations further comprise setting the invalid measurement value to 0 to indicate that the ToA is valid.

14. The non-transitory computer-readable medium of claim 11, wherein the device is a responding STA (RSTA).

15. The non-transitory computer-readable medium of claim 11, wherein the device is an initiating STA (ISTA).

16. The non-transitory computer-readable medium of claim 11, wherein the ToA error field comprises an invalid measurement subfield.

17. The non-transitory computer-readable medium of claim 11, wherein the LMR frame is a responding STA (RSTA) to an initiating STA (ISTA) LMR frame.

18. The non-transitory computer-readable medium of claim 11, wherein the LMR frame is an initiating STA (ISTA) to a responding STA (RSTA) LMR frame.

19. A method comprising:
  decoding a null data packet (NDP), for channel sounding, received from a station device during a ranging procedure;
  generating an invalid measurement value associated with a time of arrival (ToA) based on the NDP;
  generating a location measurement report frame comprising one or more fields;
  encoding the invalid measurement value into a ToA error field of the location measurement report frame; and
  cause to send the location measurement report (LMR) frame to the station device.

20. The method of claim 19, further comprising setting the invalid measurement value to 1 to indicate that the ToA is invalid.

* * * * *